United States Patent Office 3,005,376
Patented Oct. 24, 1961

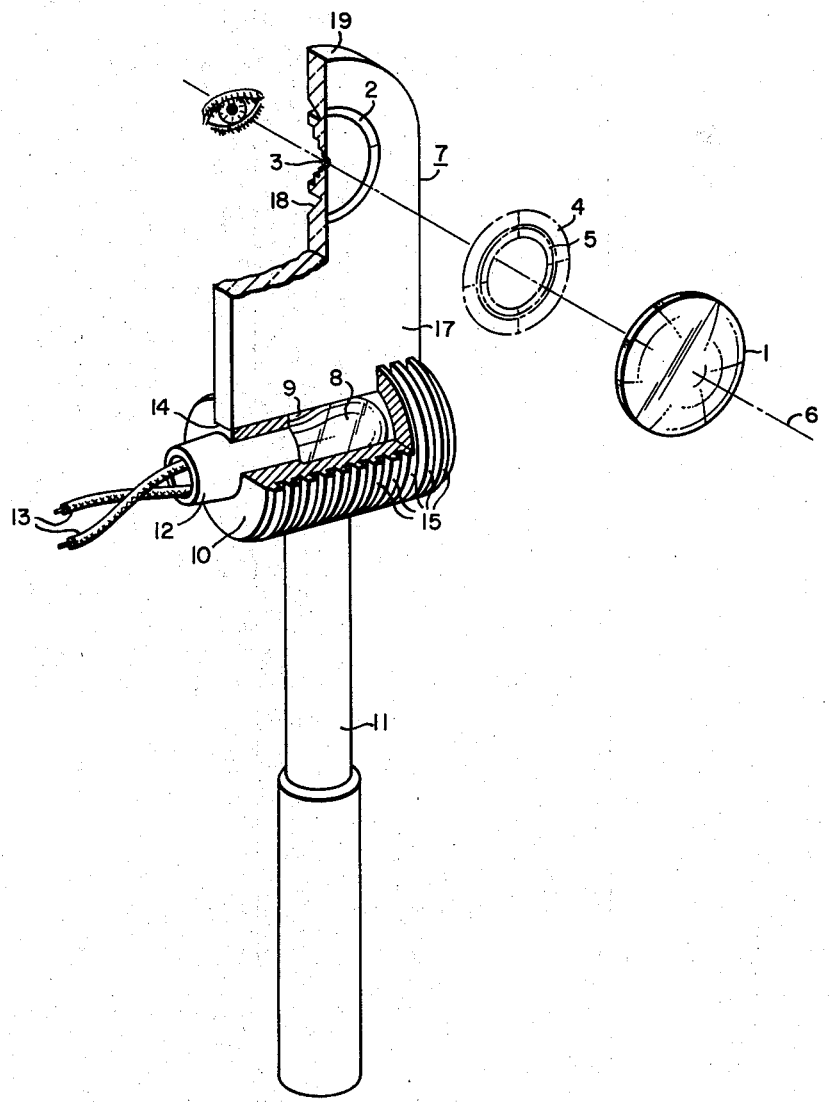

3,005,376
APPARATUS FOR LOCATING OPTICAL AXES
Paul F. Evans, Linthicum, Md., assignor to Westinghouse Electric Corporation, East Pittsburgh, Pa., a corporation of Pennsylvania
Filed June 25, 1959, Ser. No. 822,787
3 Claims. (Cl. 88—14)

The present invention relates to an apparatus for locating the optical axis of a lens or a lens system, and is particularly adapted for employment to accomplish rapid alignment of optical components of such system for test purposes, for example.

In the setting up of a lens system in behalf of testing the effectiveness of such system, for example, it becomes necessary to locate the optical axis of each of the optical elements in the system in order to effect their proper alignment. Various schemes have heretofore been used to accomplish such purpose. These include sighting along a string and viewing its reflection, as well as the employment of such as the so-called auto-collimating telescope. The string method is somewhat crude and time consuming, while employment of such as the auto-collimating telescope involves considerable expense.

In view of the foregoing remarks, it becomes a prime object of the present invention to provide a novel and inexpensive apparatus for use in locating the optical axis of a lens or lens system expeditiously.

Other objects and advantages of the invention will become apparent from the following detailed description of the invention when taken in connection with the accompanying drawing, in which the single figure represents schematically, partly in outline and partly in section, the novel apparatus for the optical axis of a lens or lenses in accordance with the invention.

Description

Referring to the drawing, the relatively simple method of locating the optical axis of a lens or lens system consists in the subjecting of such as a lens 1 to a symmetrical, preferably ring-like, light source or illuminated image 2 for causing reflections of such light source or image on the opposite surfaces of such lens, viewing such reflections through an aperture 3 located at the center of such annular light source to observe the reflection images, designated by reference numerals 4 and 5 in the drawing, corresponding to the reflections of the annular light source from the surfaces of the lens 1, and effecting relative adjustment in position between the lens 1 and the annular light source 2 to obtain concentricity of the reflection images 4 and 5. The optical axis 6 of the lens 1 is thus located.

Following this, other lens elements of a system may be added consecutively in series with the lens 1 and the reflection images of the annular light source 2 viewed through the aperture 3 brought into concentricity with the reflection images 4 and 5 of the lens 1 to obtain alignment of the optical axes of the several lens elements.

Thus it will be apparent that in accord with such method, the optical axis of a lens element may be located rapidly and brought into coincidence with the optical axis of another lens or lenses with relative ease. It will be apparent, therefore, that set-up of a lens system is greatly facilitated, by virtue of the rapidity with which the various lens elements may be brought into proper alignment.

In accord with the present invention, the relatively inexpensive apparatus whereby such method may be accomplished includes a light conducting member 7 for transmitting light from a prime light source in the form of an electric bulb or lamp 8 to illuminate the annular light source or image 2.

The lamp 8 is disposed in a chamber 9 within a holder member 10 having a handle 11 attached thereto. The lamp 8, in the well known manner, may be removably mounted in a socket 12 which extends outwardly through an accommodating opening in the holder member 10 and is provided with the usual wires 13 for energization of the lamp 8.

The holder member 10 is preferably cylindrical in form and provided with extended surfaces on its periphery to provide for dissipation of heat generated by the lamp 8 within.

The light-conducting member 7 is preferably of a generally planar shape which fits at its lowermost end, as viewed in the drawing, in a radially-extending slot 14 formed in the holder member 10 which intersects the chamber 9 to permit entrance of light from the lamp 8 into the bottom of such light pipe. External surfaces of the light-conducting member 7 preferably are aluminized, with the exception of a portion of the front surface 17 which defines the shape of the annular light source 2 as a light aperture in such surface to enhance transmission of light by internal reflection within the member 7 from the lamp 8 to such annular aperture defining light image 2. The back, or observer side of the member 7, is provided with an annular tapered surface 18 which is in registry with the annular illuminated image 2 formed in the front face 17 to reflect the light within the member 7 outwardly through such annular aperture, in the front face 17. In encirclement of the viewing aperture 3, the back face of the member 7 is provided with a series of inwardly extending concentric annular shoulders to reduce reflections of external light in the vicinity of such viewing aperture thereby to enhance the darkness surrounding the same and facilitate employment of the apparatus. The uppermost aluminized surface 19 of the member 7 is preferably of circular shape to direct light within such member 7 in the region of same inwardly toward respective portions of the reflecting surface 18 behind the illuminated aperture 2.

From the foregoing, it will be apparent that the novel apparatus of the present invention is relatively simple and may be constructed of relatively inexpensive materials. For example, the member 7 may be made of a relatively small flat piece of transparent plastic such as polymerized methyl methylmethacrylate sold under the trademark "Lucite," which may be provided with the reflecting surface 18, provided with the viewing aperture 3, and aluminized with relative ease in the presence of the necessary masking to obtain the illuminated image 2 aperture, the holder member 10 may be made of such as aluminum as by casting or machining to provide the necessary chamber 9, slot 14 and extended surfaces 15 therein. The handle 11 may be made of any suitable, preferably heat-insulating, material and anchored as desired to the holder member 10, while the lamp 8 and socket 12 are available as standard off-the-shelf items in any electrical supply store.

While there has been described hereinbefore what is at present considered a preferred embodiment of the invention, it will be apparent that changes and modifications may be made with respect to the embodiment illustrated without departing from the spirit of the invention. It will be understood, therefore, that all those changes and modifications as fall fairly within the scope of the present invention, as defined in the appended claims, are to be considered as a part of the present invention.

I claim as my invention:
1. An apparatus for location of the optical axis of a lens or lenses to facilitate their alignment, said apparatus comprising a planar-shaped light-conducting member of light-conductive material adapted at one end to be exposed to a source of illumination, said substantially planar-shaped light-conducting member having a viewing aperture extending therethrough from a rear surface thereof to a front surface thereof, light-reflecting material substan- tially coating the outer surface of said light-conducting member with the exception of the area of its end which is adapted for exposure to a light source and with the exception of a portion of its front face surrounding the aforesaid viewing aperture, the rear surface of such member being provided with an annular inwardly extending reflector surface for directing light outwardly through the aforesaid area in the front face of same.

2. The combination as set forth in claim 1 wherein an end of the aforesaid light-conducting member opposite to its light-input end is curved to reflect a respective portion of the light transmitted through such member toward respective portions of the aforesaid annular reflecting surface.

3. Apparatus for locating the optical axis of a lens or a series of lenses to facilitate alignment of same in accord with the described method, said apparatus comprising a housing, an electric lamp within said housing, a light-conducting member mounted in said housing in exposure to said lamp and having an area on an external surface thereof in receipt of light transmitted through said light-conducting member, said area being coated on its outer surface with a light-opaque material except for a portion patterned to provide an illuminated symmetrical image for reflection from the surface of a lens, said light-conducting member having a viewing aperture extending therethrough which opens centrally through said illuminated image area, and a handle attached to said housing to facilitate manipulation of such apparatus.

References Cited in the file of this patent

UNITED STATES PATENTS

| | | |
|---|---|---|
| 834,020 | Pellow | Oct. 23, 1906 |
| 2,428,975 | Lamb | Oct. 14, 1947 |
| 2,577,807 | Pryor | Dec. 11, 1951 |
| 2,623,313 | Fuchs | Dec. 30, 1952 |

OTHER REFERENCES

"Method of Determining the Optical Center of Spectacle Lenses," Blair, American Journal of Opthalmology, vol. 35, issues 1, January 1952, pages 107, 108.

"Foster Near Vision and Muscle Test," The Optician, Sept. 26, 1952, pages 257, 258.